United States Patent [19]

Keller et al.

[11] 4,353,874

[45] Oct. 12, 1982

[54] ROTARY TUBE REACTOR FOR THE THERMAL TREATMENT OF MATERIAL

[75] Inventors: Wolfgang Keller, Bergisch-Gladbach; Wolfgang Weiss, Cologne, both of Fed. Rep. of Germany

[73] Assignee: Bayer Aktiengesellschaft, Leverkusen-Bayerwerk, Fed. Rep. of Germany

[21] Appl. No.: 132,948

[22] Filed: Mar. 24, 1980

[30] Foreign Application Priority Data

Apr. 12, 1979 [DE] Fed. Rep. of Germany ....... 2914964

[51] Int. Cl.³ ............................................. B01J 19/18
[52] U.S. Cl. .................................. 422/193; 422/197; 422/209; 422/229; 422/236
[58] Field of Search ............... 422/193, 194, 197, 209, 422/229, 233, 205, 202, 236

[56] References Cited

U.S. PATENT DOCUMENTS

| | | | |
|---|---|---|---|
| 2,132,151 | 10/1938 | Fenske et al. | 428/193 |
| 2,907,644 | 10/1969 | Cunningham et al. | 422/193 |
| 3,490,879 | 1/1970 | Urban | 422/197 |
| 4,010,081 | 3/1977 | Martt | 422/209 |

*Primary Examiner*—Hiram Bernstein
*Attorney, Agent, or Firm*—Sprung, Horn, Kramer & Woods

[57] ABSTRACT

A rotary tube reactor, having at least one treatment line composed of tubes whose individual sections have gas chambers which are sealed from each other and wherein each section has a gas outlet and adjacent sections are joined together by material passages, is used for thermal treatment. In accordance with the invention, the reactor is used for the thermal treatment of carbon containing materials, the production of activated carbon, the activation of zeolite granules, the production of pyrophorous metals in the form of powder to lumpy solid materials and substances in liquid form with the evolution of gas.

8 Claims, 13 Drawing Figures

ROTARY TUBE REACTOR FOR THE THERMAL TREATMENT OF MATERIAL

BACKGROUND OF THE INVENTION

The invention relates to a rotary tube reactor for the thermal treatment of powdered to lumpy solid material and/or substances in liquid form with the evolution of gases and optionally with the supply of additional substances, consisting of a bundle of axially parallel tubes which are mounted in plates arranged perpendicularly thereto, the individual tubes being joined together to form at least one treatment line with a material supply means at its beginning and a material outlet at its end. The invention also relates to methods using the above-mentioned rotary tube reactor.

Reactors of this type are used for thermal treatment by heating or cooling, for example, for the purpose of heating or cooling material, for example, with vaporisation or evaporation, with crystallisation, melting or setting and sublimation.

However, these reactors are also used for carrying out chemical reactions for the production of chemical substances with the participation of solid and/or liquid and/or gaseous reactants.

In principle, rotary tube reactors of this type in the form of driers or heat exchangers are known and are used for drying a very wide variety of granula or powdered substances. The material to be dried is generally conveyed through the tubes together with the heating gas but indirect heating is also known.

These apparatuses do not allow intentional intervention at certain points in the course of the reaction.

SUMMARY OF THE INVENTION

Accordingly an object is to find a rotary tube reactor which allows intervention in the treatment of the material at defined points. Moreover, methods using this reactor should be improved.

This object is achieved according to the invention in that the treatment line is divided into individual sections whose gas chambers are sealed from each other, each section being provided with a gas outflow and the adjacent portions being joined together by material passages.

This allows defined gaseous atmospheres to be maintained at desired pressures in the individual sections of the treatment line. A reaction can be controlled exactly by the selection of the lengths of the sections and influence of the transportation of the material in each section, i.e. by controlling the residence time, without the material present being exposed to damage. Due to the possibility of intervention, the invention avoids unnecessary residence times so that structural over dimensioning is avoided and energy is saved. It is thus possible to carry out several relatively large operations in succession in a single apparatus. Transmissions between individual apparatuses and possible intermediate storage are thus avoided.

According to a development of the invention, at least one portion is provided with an additional material inlet and/or material outlet. This allows additional material, for example liquids or gases but also fine-particle solids to be supplied to or removed from the treatment material at specific points on its path through the treatment line. It goes without saying that it is also possible to introduce several additives simultaneously in identical portions.

Each tube preferably forms one section. This embodiment is structurally very desirable because the inlets and outlets for the additives can then be arranged at the ends of the tubes. Obviously, this does not rule out the possibility of specially selecting the feed point inside a section. However, it is only possible to introduce or discharge material at the end if the section extends over at least one entire tube length or several tube lengths of the treatment line. If the individual sections do not have a complete tube length, the seals, which are otherwise provided at the connecting points between two tubes, should be provided inside the tube. Adjacent gas chambers are sealed from each other in a very simple manner by piling up the treatment material so as to form a plug. For this purpose it is preferable to use conveyors such as, for example, core-less conveying spirals mounted on the wall of the tubes or constrictions formed by transverse walls. If the material passages between two tubes simultaneously serve to limit a section, they are preferably also designed in such a way that a permanent accumulation of material is present to prevent the passage of the gases. Transverse connections with flaps, for example, can be used for this purpose, these flaps opening and closing automatically due to the rotation of the reactor. By suitable design in terms of weight, these flaps also remain closed up to a desired pressure.

Several treatment lines are preferably provided.

This has the advantage that the treatment material can be fed to the individual treatment lines in a relatively small quantity so as to present a large free surface area of treatment material so that the reactions and transfer of heat can be controlled.

According to a development of the invention, the material outlets of several parallel treatment lines are, connected to the material supply of another treatment line.

Furthermore, it is also possible to connect the material outlet of an individual treatment line with the material supply means of several treatment lines.

New possibilities in the carrying out of reactions are provided by bringing treatment lines together or by moving them apart. Thus, for example, in parallel-connection treatment lines, an additive can be fed to one treatment line but not to the other so that the material from the two treatment lines is then mixed together at the entry point into a common third treatment line. It is also possible to recirculate a proportion of the finished material and to feed it back to the feed material, for example, to make it leaner, at any point.

The material supply means of the individual treatment lines preferably consist of a common annular trough into which a feed apparatus opens. This trough is arranged in such a way that it is flanged, for example, on the end plate of the reactor so that the fed material maintains a certain level in the region which is located at the bottom during each rotation, the material being introduced during the passage of the treatment line inlets through this accumulation of material. The trough optionally exhibits shovel elements which assist the introduction into the treatment lines.

Conveyors are preferably arranged in the sections. The conveying speed through the sections can be controlled using these conveyors. Suitable conveyors include, in particular, conveying spirals which are arranged on the wall of the tubes or shovel-like fittings. Attachments which increase and/or clean the surface such as cams, shovels, pins, ridges, chains, half-tubes can also be provided.

The rotary tube reactor according to the invention can be used commercially in many ways. Thus it can be used in principle during thermal treatment, i.e. during heating or cooling or to keep material at a certain temperature over a prolonged time interval. It is irrelevant here whether a chemical reaction or only a physical reaction takes place in the material to be treated.

The present invention therefore also relates to the use of the rotary tube reactor for various methods.

The invention relates to the use of the rotary tube reactor for the activation of zeolite granules, for the production of fine-particled metals by reduction of oxidic materials using reducing gases and for the thermal treatment of a mixture composed of fluorspar and sulphuric acid for the production of hydrofluoric acid.

Moreover, fine-particled ores can be reduced or oxidised for the preparation of the product in the rotary tube reactor described above.

Markedly exothermal processes can also be carried out in the rotary tube reactor since the heat is discharged uniformly over the reaction chamber due to the distribution of the reaction gas or gases. Such processes include, for example, the gasification of coal, the chlorination of metals or metal oxides, the production of aluminium fluoride from aluminium oxide using hydrofluoric acid and also contact processes such as the oxidation of $SO_2$ to $SO_3$.

The invention also relates to the method of producing activated carbon using the rotary tube reactor, which is characterised in that carbon-containing materials are introduced continuously into the rotary tube reactor described above, heated to temperatures between 240° and 1050° C. and the gases formed and the treated material removed continuously.

BRIEF DESCRIPTION OF THE DRAWINGS

Several embodiments of the rotary tube reactor according to the invention are illustrated purely schematically in the drawings and are described in more detail below.

DETAILED DESCRIPTION OF THE INVENTION

Figure 1:
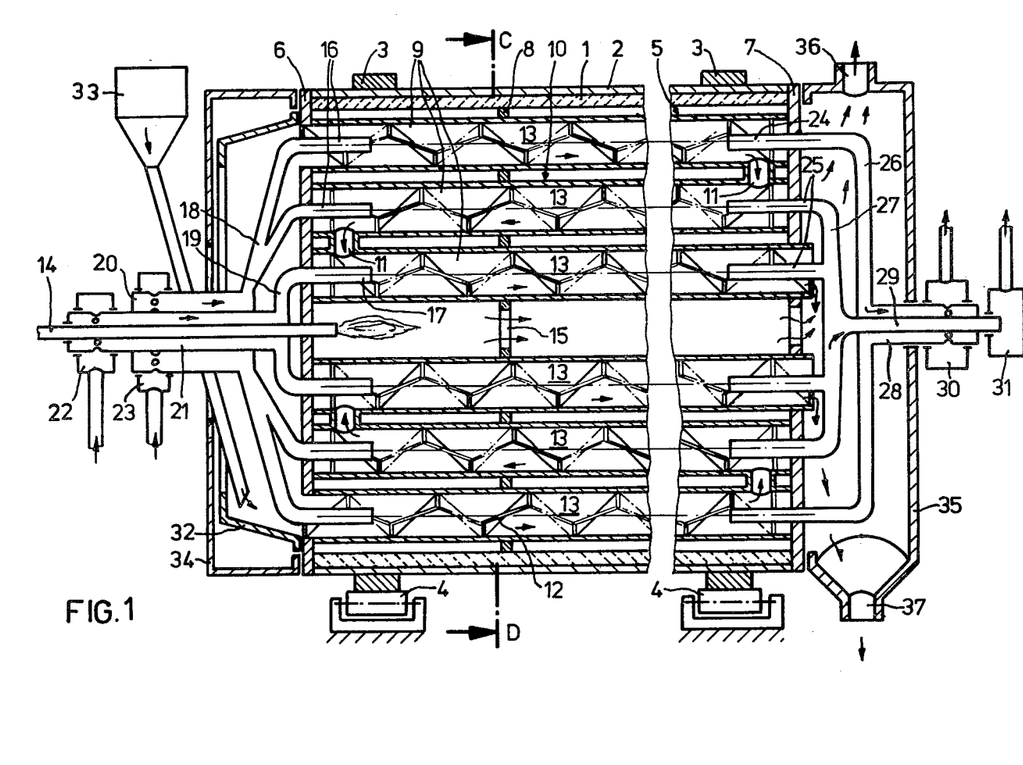
FIG. 1 shows a rotary tube reactor according to a first embodiment in a section along line A–B of FIG. 2.
Figure 2:
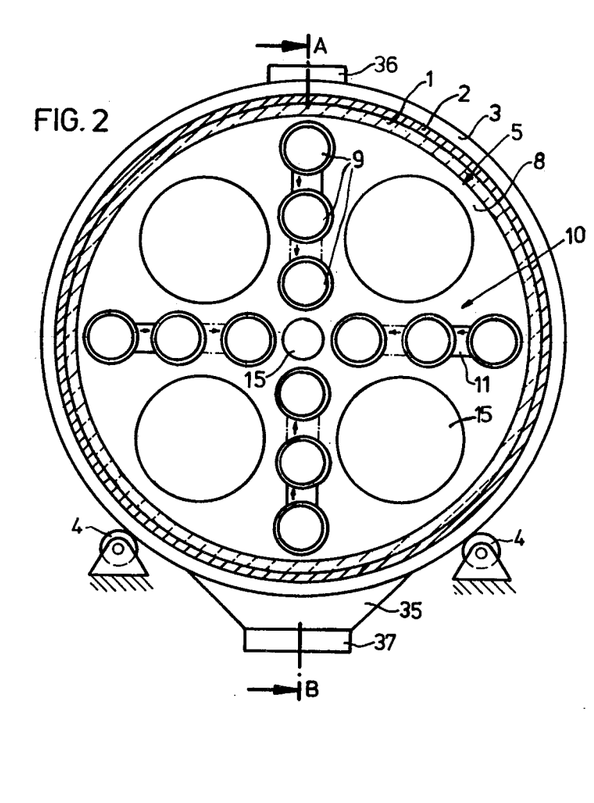
FIG. 2 shows a section through the reactor along line C–D of FIG. 1.

In FIGS. 1 and 2 a rotary tube reactor consists of an outer casing 2 lined with refractory material 1 and surronded by two ball races 3 which are mounted on support rollers 4. The drive which is effected by means of a pinion and toothed wheel, is not illustrated.

The outer casing 2 surrounds an insert 5. The insert consists, in particular, of end plates 6, 7 and intermediate plates 8 in which treatment tubes 9 are mounted. Each of the treatment tubes 9 forms a chamber, i.e. a section, an several sections of this type are connected in series to form a treatment line 10, four of which are shown in FIG. 2. The individual sections 9 are joined together by material passages 11. Core-less spirals located on the internal walls of the tubes act as conveyors 12 in the sections 9. The material passages 11 are designed in such a way that gas chambers 13 of the individual section 9 are sealed from each other by an accumulation of material. A burner lance 14 by means of which the section 9 are indirectly heated projects into the insert 5. The intermediate plates 8 provide openings 15 for the waste gases. Material feed nozzles 16, 17 are guided through the end plate 6 and are connected via connecting tubes 18, 19 with concentric chambers 20, 21 lying on the rotational axis. Additional treatment materials, in particular gas or liquid in this embodiment, are fed to them via sliding ring chambers 22, 23. Outlet nozzles 24, 25 lead through the end plate 7 out of the sections 9 and emerge via connecting tubes 26, 27 in chambers 28, 29 which are concentric with the rotational axis and from which the materials are discharged via sliding ring chambers 30, 31. It goes without saying that the materials can also be guided in the opposite direction through the sections 9, which may be advantageous with certain reactions. The end plate 6 has on its exterior an annular trough 32 into which the material to be treated is introduced via a feed apparatus 33, whence it is introduced into the open sections 9 each of which forming the beginning of a treatment line 10. For reasons of safety and to provide a better seal, the end plate 6 is provided with a stationary head piece 34. The end plate 7 is also provided with a head piece 35 which is in turn provided with a gas vent nozzle 36 and a material outlet 37.

Figure 3:
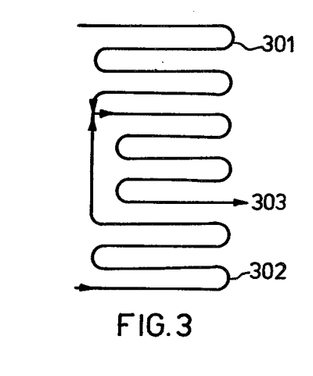
FIG. 3 shows a diagram illustrating the bringing together of two treatment lines with a third.

In FIG. 3, two treatment lines 301, 302 are combined to form another treatment line 303.

Figure 4:
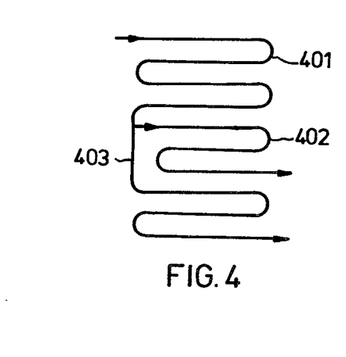
FIG. 4 shows a diagram of the division of a treatment line into two others.

In FIG. 4, a treatment line 401 is divided into two other treatment lines 402, 403.

Figure 5:
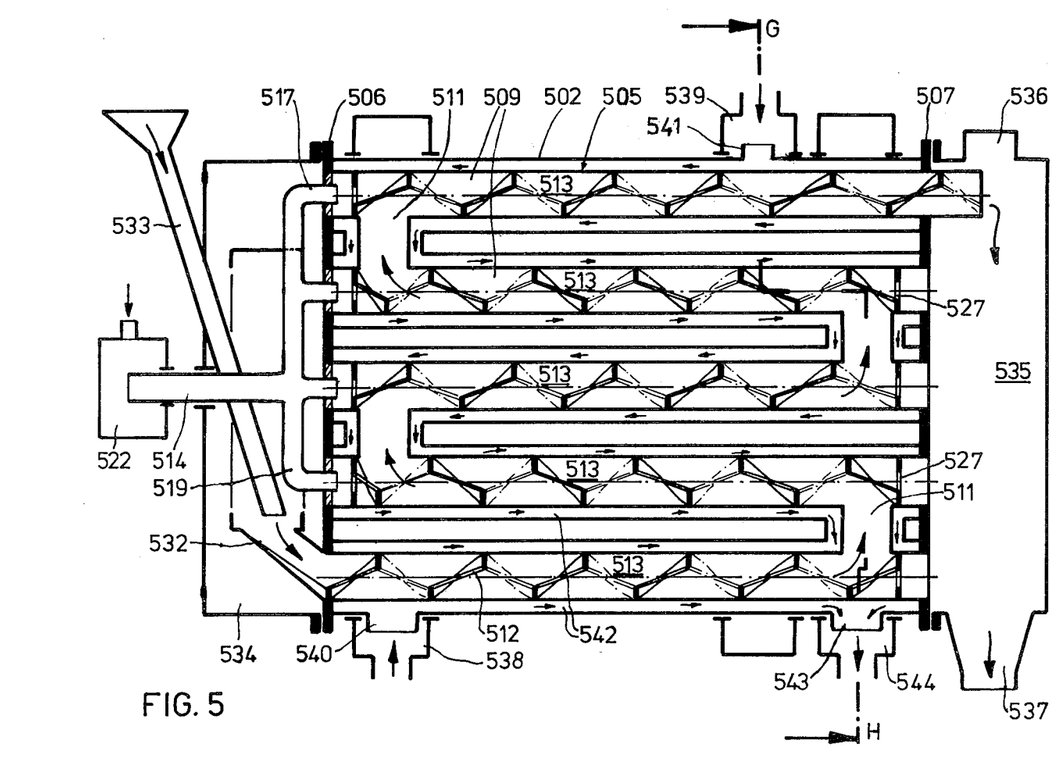
FIG. 5 shows a rotary tube reactor according to a second embodiment in a section along line E–F of FIG. 6.
Figure 6:
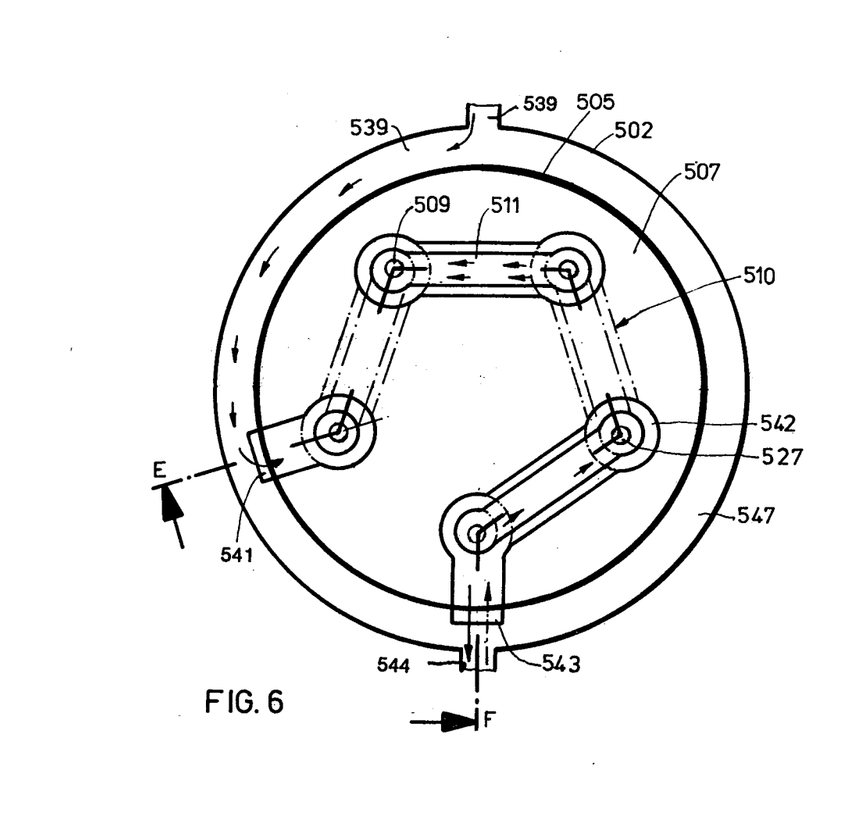
FIG. 6 shows a section through the reactor along line G–H of FIG. 5.

In FIGS. 5 and 6, the rotary tube reactor consists of an outer casing 502. The bearing (not shown) is represented by ball races and support rollers. The drive which is effected by a toothed wheel and pinion is also not shown. The outer casing 502 surrounds an insert 505. The insert consists, in particular, of end plates 506, 507 in which treatment tubes 509 are mounted. Each of the treatment tubes 509 forms a chamber, i.e. a section. Five such sections 509 are connected in series to form a treatment line 510 (FIG. 6). The individual sections 509 are joined together by material passages 511. Core-less spirals which can be inserted through the end plates 506 or 507 and fixed to them, act as conveyors 512. The material passages 511 are designed in such a way that the gas chambers 513 of the individual sections 509 are sealed from each other by accumulation of the material.

Heating is effected by flame gases which can be introduced via sliding ring hoods 528, 539 through openings 540, 541 provided in the outer casing 502 and pass through heating casings 542 surrounding the tubes 509 and the material passages 511 to the common outlet opening 543 whence they are discharged via a sliding ring hood 544. Gases can be supplied via a sliding ring hood 522 to an axial chamber 514 whence they pass via connecting tubes 519, whose nozzles 517 point through the end plate 506 in the sections 509, into these sections 509. The sections 509 are provided with gas passages 527 toward the end plate 507. The end plate 506 has a trough 532 on its exterior in which the material to be treated is introduced via a feed device 533, whence it is introduced into the first section 509 of the treatment line 510. The end plate 506 is provided with a stationary head piece 534. The end plate 507 is provided with the stationary head piece 535 provided with a gas vent nozzle 536 and a material exit 537.

Figure 7:
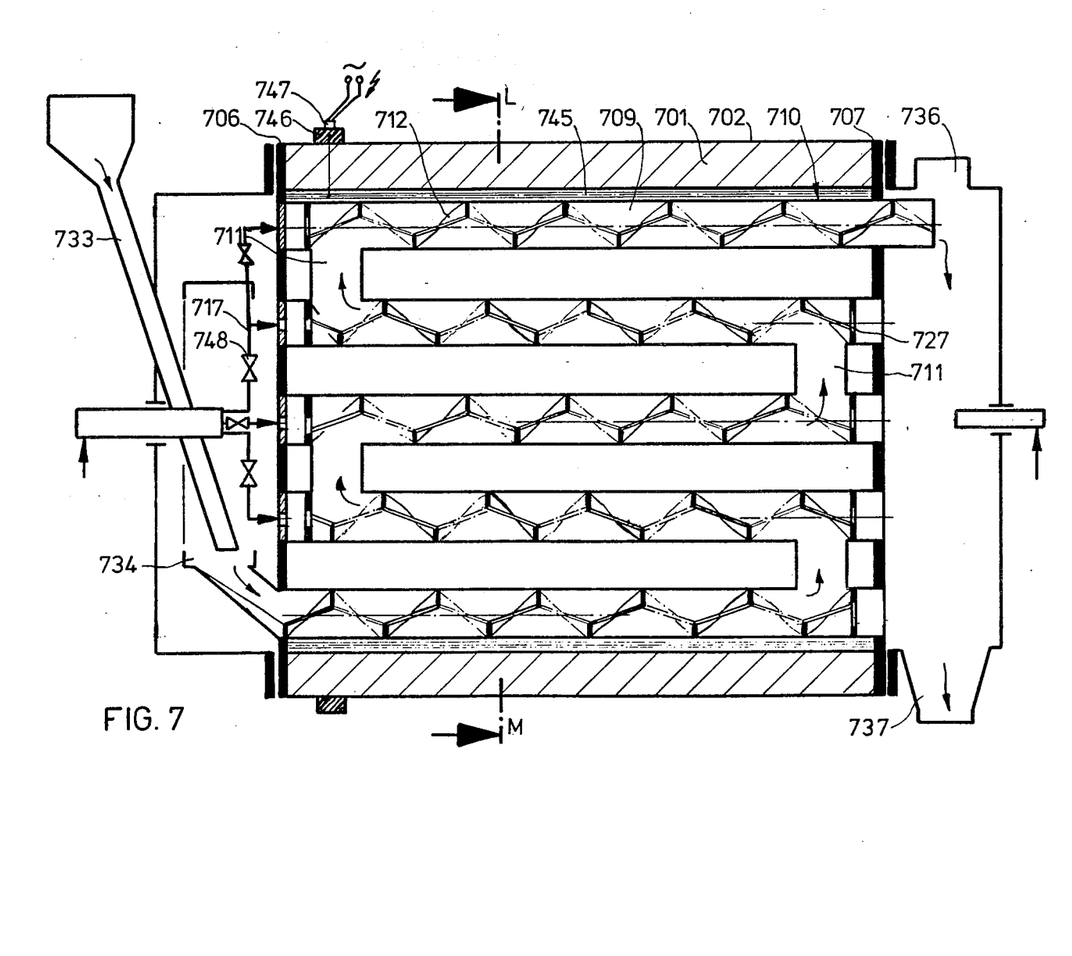
FIG. 7 shows the rotary tube reactor according to a third embodiment in a section along line I–K of FIG. 8.
Figure 8:
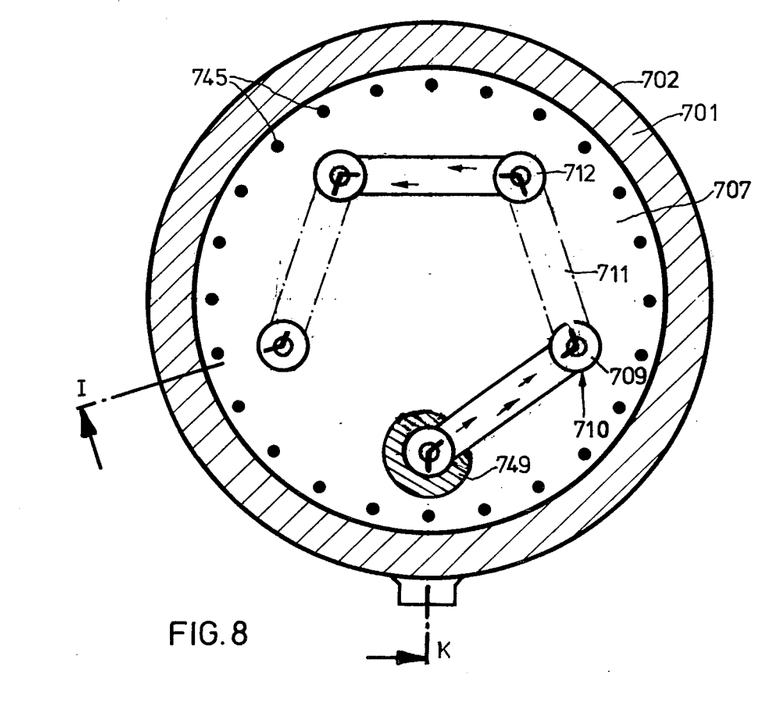
FIG. 8 shows a section through the reactor along line L–M of FIG. 7.

In FIGS. 7 and 8, the rotary tube reactor consists of an outer casing 702 lined with refractory material 701. The bearing and drive are not shown. Treatment tubes 709 are mounted in end plates 706, 707. Each of these treatment tubes 709 forms a chamber, i.e. a section. Five of these sections 709 are connected in series to form a treatment line 710 (FIG. 8). The individual sections 709 are joined together by material passages 711. Core-less coils 712 are arranged in the sections 709. Heating is effected by means of electric resistance heating rods 745 to which current is supplied via slip ring 746 and sliding contact 747. The material is fed via the chute 733 and the trough 734. The connecting tubes 717 can be charged with fluids through individual connecting tubes 717 which can be blocked by slide 748. The fluids can escape through the gas outlets 727. The first section 709 is surrounded by thermally insulating material 749 (FIG. 8).

Figure 9:
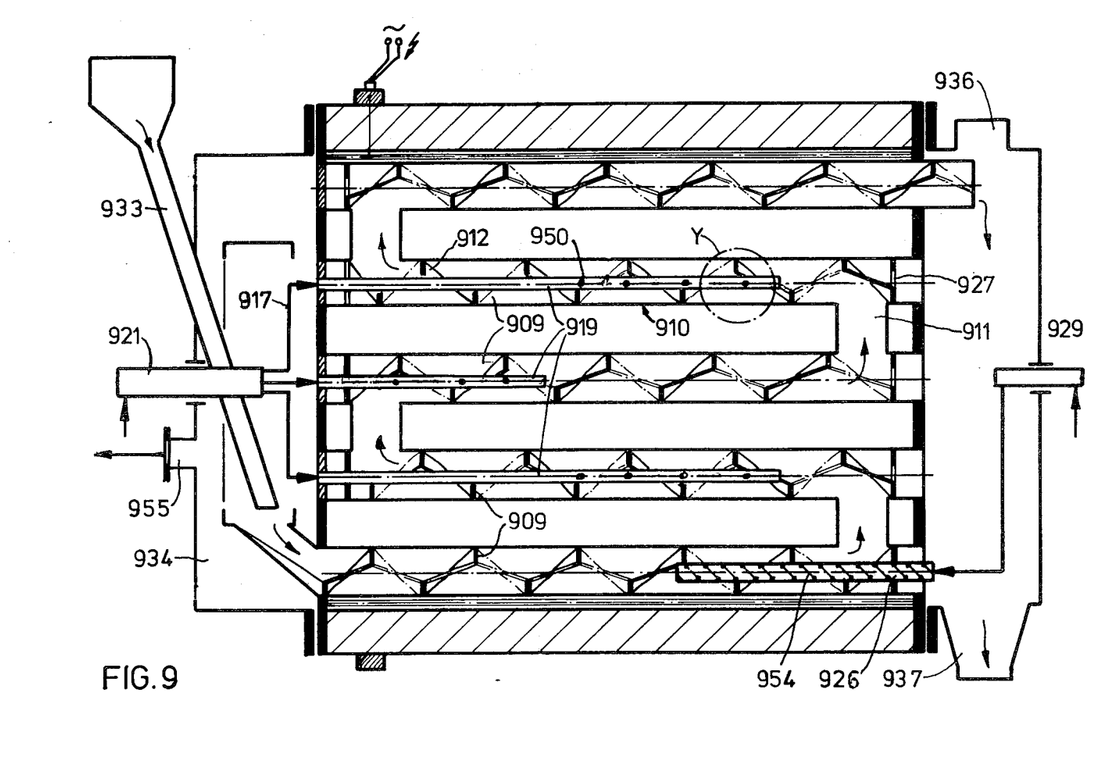
FIG. 9 shows a variation of the rotary tube reactor according to FIGS. 7 and 8 in a longitudinal section.
Figure 10:
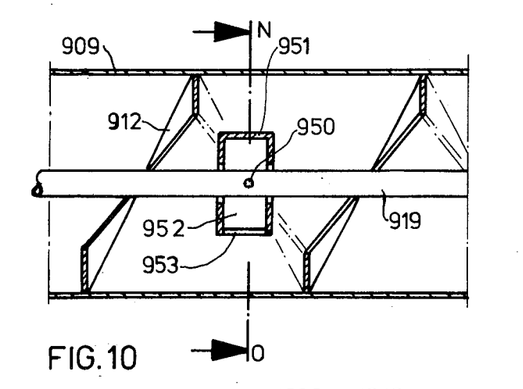
FIG. 10 shows an enlarged view of the detail Y from FIG. 9 in longitudinal section.
Figure 11:
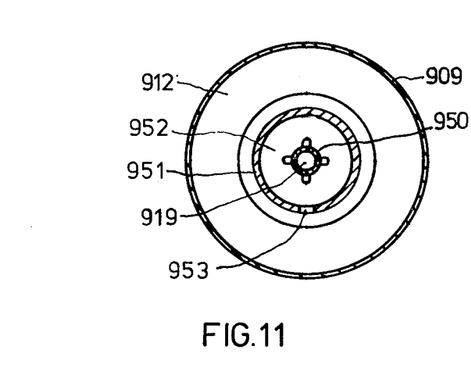
FIG. 11 shows a section along line N–O of FIG. 10.

In FIGS. 9, 10, 11, the structure of the reactor corresponds essentially to that in FIGS. 7 and 8. However, charging tubes 919 are provided which each penetrate axially and far into the second to fourth section 909 of the treatment line 910. They communicate with an axial supply 921 and have openings 950. The openings are each covered by a hood 951 (FIG. 10) which encloses an annular chamber 952 and has a gap 953. Moreover, another charging tube 926 which has a return conveying spiral 954 and communicates with a supply 929 is inserted in the downstream end of the first section 909. A suction nozzle 955 is provided on a sealed head piece 934.

Figure 12:
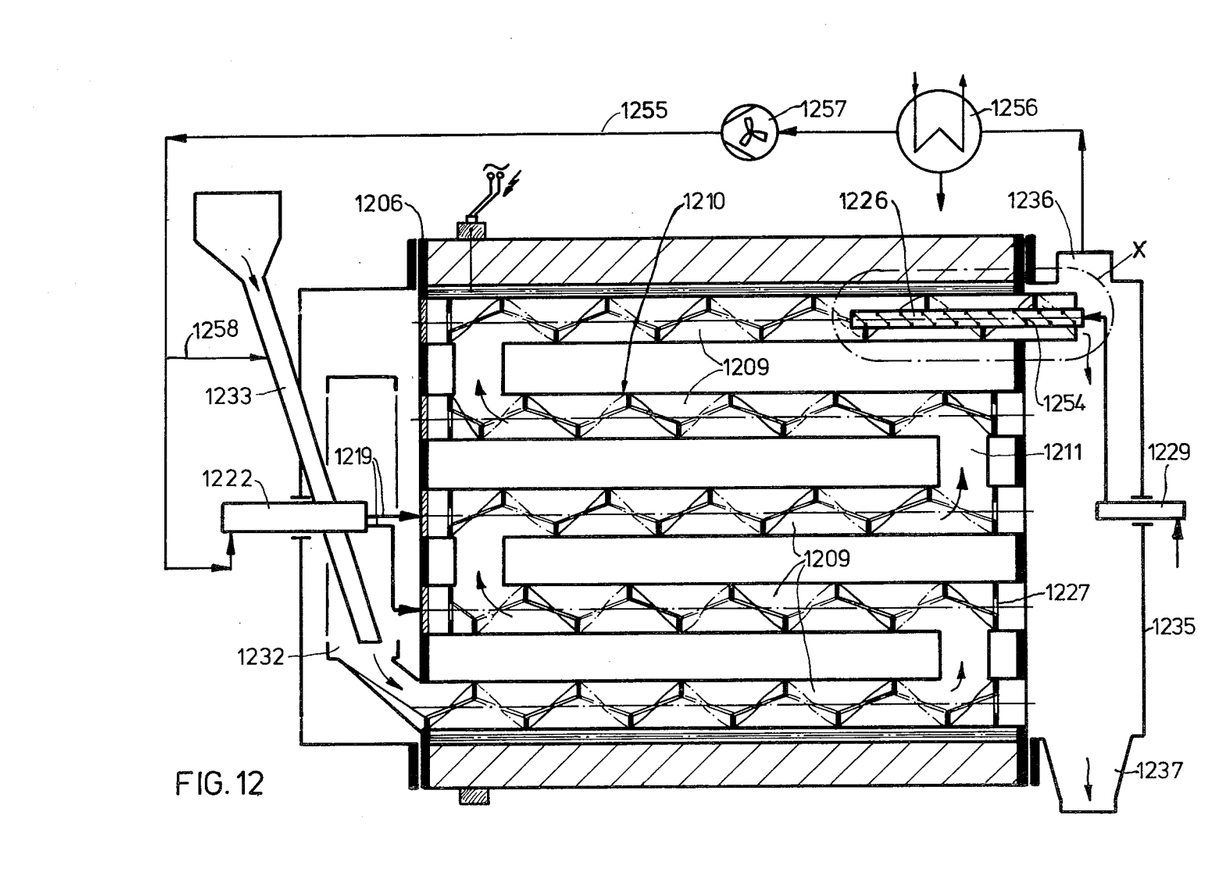
FIG. 12 shows another variation of the rotary tube reactor according to FIGS. 7 and 8 in longitudinal section.
Figure 13:
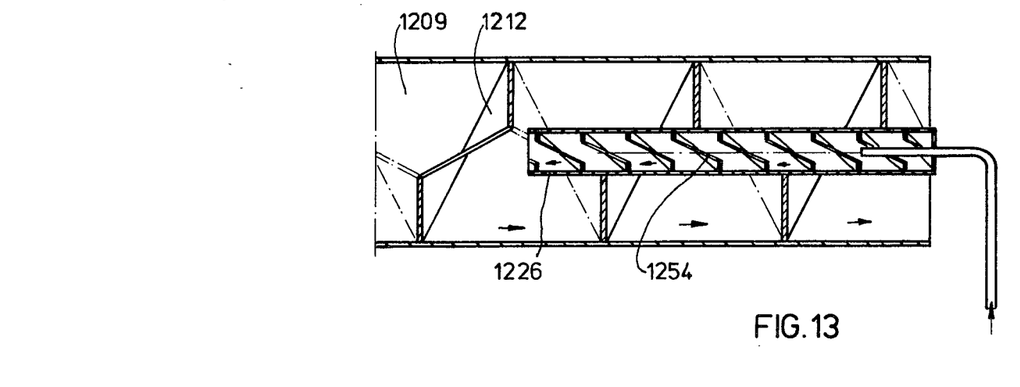
FIG. 13 shows an enlarged view of the detail X from FIG. 12.

The reactor according to FIGS. 12, 13 also corresponds essentially to the one in FIGS. 7 and 8. A charging tube 1226 which communicates with a supply 1229 is inserted in a last section 1209 of a treatment strand 1210 on the exit side. The charging tube 1226 has a coreless return conveying coil 1254. A charging device is designated by 1223 and opens into a trough 1232 fixed on an end plate 1206. A downstream head piece 1235 is provided with a material exit 1237. Gas outlet 1236 is connected to a return pipe 1255 opening into a supply 1222. Connecting tubes 1219 branch from it and lead into a second and third section 1209 of the treatment line 1210. A cooler 1256 and a fan 1257 are connected in the return pipe 1255. Moreover, a branch line 1258 branches from the return pipe 1255 and opens into the feed device 1233.

A few examples are given in connection with the use of the rotary tube reactor according to the invention for various methods.

EXAMPLE 1

Thermal pretreatment of activated carbon

A rotary tube reactor of the design shown in FIGS. 5 and 6 was used. It consisted of the rotating casing 502 having ends 506, 507. The tubes 509 were inserted in it concentrically with the rotational axis of the reactor. They were sealed on the feed side and provided with gas inlets 517. They were open at the other end and the gases could escape into the head piece 535.

Core-less coils 512 were arranged in the tubes 509. One winding had a useful volume of 1.5 liters. The entire reactor had 100 windings. Heating was effected by gas flames which entered through the openings 540, 541 and were passed through the casing tubes 542 surrounding the sections 509. The two separate heating lines were adjusted to 240° C. (first section 509) and 300° C. (remaining sections 509). The heating gases were vented together through the opening 543. The reactor was charged via the chute 533 with 40 kg per hour of mouldings consisting of finely ground hard coal and an aqueous phenol binder which had been produced by an extrusion moulding method. The second to fourth sections 509 were each covered with 0.5 $m^3_N$/h of inert gas and the last section 509 was charged with 10 $m^3_N$/h of inert gas. After a residence time of about 2.5 hours (corresponding to 0.67 rotations per minute) 32 kg per hour of rigid mouldings were obtained there being eminently suitable for further processing. The moisture expelled and other materials discharged left the reactor through the gas vent 536 and the mouldings through the material exit 537.

EXAMPLE 2

Low temperature carbonization of activated carbon

A reactor according to FIGS. 7 and 8 with electric radiant heating was used, but without the insulation 749 in the first section 709. The strong external insulation 701 ensured that the heat losses were reduced. The winding volume and number of windings corresponded to the embodiment according to FIGS. 5 and 6.

A temperature of 780° C. was maintained in the reactor by radiant heating and 76 kg per hour of the mouldings obtained according to Example 1 were introduced via the feed device 733. The second to fourth as well as the fifth tube sections 709 were each covered with 1 $m^3_N$/h of nitrogen. After a residence time of 1.5 hours (corresponding to 1.1 rpm) in the reactor, 47 kg per hour of rigid mouldings were obtained at the exit 737. The low temperature carbonization gases were discharged through the gas vent 736.

EXAMPLE 3

Activation of activated carbon

The rotary tube reactor used for activation corresponded to the one according to FIGS. 7 and 8, but the first section 509 was not insulated. Heating was effected to 980° C. and shaped coke obtained in Example 2 was introduced at 40 kg per hour. 14.4 kg per hour of steam was blown into each of the second to fifth sections 709. 13.6 kg/h of activated material was obtained at the exit 737 at a rotational speed of 0.83 rpm after a residence time of about 2 hours. The activated material had very good properties.

EXAMPLE 4

Activation of zeolite granules

The reactor used corresponded to FIGS. 7 and 8, the first section 709 being surrounded by a thermally insulating layer 749 (FIG. 8) so that heating and dehydration took place carefully in the first section 709 despite the uniform temperature of 400° C. inside the reactor. The reactor was charged with 50 kg per hour at 110° C. of dried zeolite granulate. 5 $m^3_N/h$ of dry air was supplied via the gas inlets 717 and a residence time of about 1 hour was arranged for the reactor above a rotational speed of 1.67 rpm. 38.4 kg per hour of active granulate having a residual water content of less than 1% was obtained at the outlet 737.

EXAMPLE 5

Production of hydrofluoric acid from preheated fluorspar

The reaction between fluorspar and concentrated sulphuric acid was carried out in a reactor according to FIGS. 9, 10 and 11. The first section 909 was provided at its downstream end with a charging tube 926 which had a return conveying screw 954 in its interior, through which 15 $m^3_N/h$ of air preheated to 400° C. was supplied. As the charging tube 926 fitted exactly into the conveying coil 912 and its threads were filled continuously with material, the air had to pass the first section 909 in a countercurrent, leave it through the material feed opening and was discharged through the nozzle 955 at the head piece 934. Impurities were removed in this way.

A tube 919 was introduced far into the second to fourth section 909. An opening 950 was provided for each winding of the conveying coil 912 (FIGS. 10, 11). The sulphuric acid needed for the reaction was thus introduced and flowed in a uniform distribution from all openings 950. The openings 950 were each surrounded by an annular chamber 952 which collected the sulphuric acid during the rotation and allowed it to flow out downwards through the openings 953. 39 kg per hour of finely ground fluorspar was metered via the feed device 933. 51 kg per hour of concentrated sulphuric acid was distributed in the second to fourth sections 909. The interior of the reactor was heated to between 350° and 400° C. 68.4 kg per hour of fine-granulated anhydrite was removed from the material exit 937 designed as a sluice, while the hydrofluoric acid formed was removed at the gas vent 936.

EXAMPLE 6

Production of finely divided iron powder

When using the reactor, care had to taken to carry out the reaction $Fe_2O_3 + 3H_2 \rightarrow 2Fe + 3H_2O$ at a water vapour partial pressure which was as low as possible. The reactor according to FIG. 12 was used as pure hydrogen could be introduced into its last section 1209 in a countercurrent. The supply was effected through the charging tube 1226 and the material was prevented from issuing by a return conveying spiral 1254. The interior of the reactor was heated to 450° C. and 40 kg per hour of iron oxide was introduced via gas-tight, hydrogen-rinsed hoppers by means of the feed device 1233. 16.8 $m^3_N/h$ of pure dry hydrogen was fed via the charging tube 1226 to the reactor and flowed through the two last sections 1209 in a countercurrent. Further 10 $m^3_N/h$ of hydrogen was introduced through the connecting tubes 1219 into the first section via the branch line 1258 and the feed device 1233 and into the second to third sections, and were recirculated from the gas vent 1236 via the return pipe 1255. The hydrogen was freed from reaction water in the cooler 1256. The hydrogen gas was compressed by the fan 1257. 27.9 kg of fine particled iron powder was sluiced out per hour at the material exit 1237.

What is claimed is:

1. In a rotary tube reactor for the thermal treatment of material in the form of powdered to lumpy solid material and/or substances in the form of liquid, with evolution of gases and optionally the supply of other substances, having a bundle of axially parallel tubes which are mounted in plates arranged perpendicularly thereto, wherein the individual tubes are joined together to form at least one treatment line whose beginning is provided with material supply means and whose end is supplied with a material outlet, the improvement wherein: the treatment line includes means dividing same into individual sections forming gas chambers which are sealed from each other and capable of being maintained at different pressures relative to each other, wherein each section has at least one conveying element rotatable therewith to convey material through the section, a gas outlet and adjacent sections are joined together by material passages.

2. A rotary tube reactor according to claim 1, wherein at least one section includes an additional material inlet.

3. A rotary tube reactor according to claim 1 or 2, wherein at least one section includes an additional material outlet.

4. A rotary tube reactor according to claim 1, wherein each tube forms one section.

5. A rotary tube reactor according to claim 1, comprising a plurality of parallel treatment lines.

6. A rotary tube reactor according to claim 5, further comprising means joining the material outlets of at least two parallel treatment lines to the material inlet of another treatment line.

7. A rotary tube reactor according to claim 5 or 6, further comprising means joining the material outlet of one individual treatment line to the material inlets of at least two other treatment lines.

8. A rotary tube reactor according to claim 5, wherein the material supply means of the individual treatment lines comprises, a common annular trough and a feed device opening into same.

* * * * *

UNITED STATES PATENT AND TRADEMARK OFFICE
CERTIFICATE OF CORRECTION

PATENT NO. : 4,353,874
DATED : October 12, 1982
INVENTOR(S) : Wolfgang Keller et al It is certified that error appears in the above—identified patent and that said Letters Patent is hereby corrected as shown below:

| | |
|---|---|
| Col. 3, line 48 | Delete "Fig. 5" and insert --Fig. 3-- |
| Col. 4, line 7,8 | Delete "surronded" and insert --surrounded-- |
| Col. 4, line 24 | Delete "section" and insert --sections-- |
| Col. 5, line 2 | Delete "528" and insert --538-- |

Signed and Sealed this

Nineteenth Day of November 1985

[SEAL]

Attest:

DONALD J. QUIGG

Attesting Officer

Commissioner of Patents and Trademarks